April 5, 1927.
D. R. BOWEN ET AL
1,623,159
MACHINE FOR MIXING OR MASTICATING RUBBER AND LIKE MATERIAL
Filed Oct. 15, 1921      3 Sheets-Sheet 1
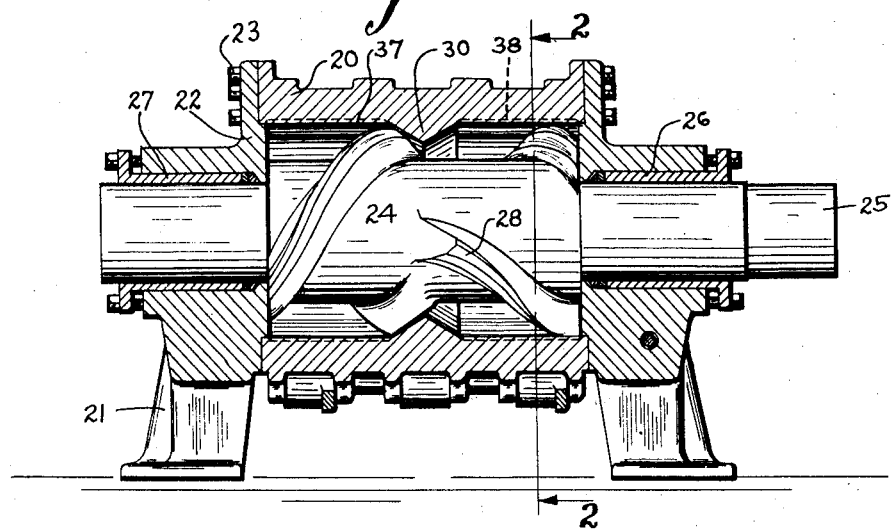
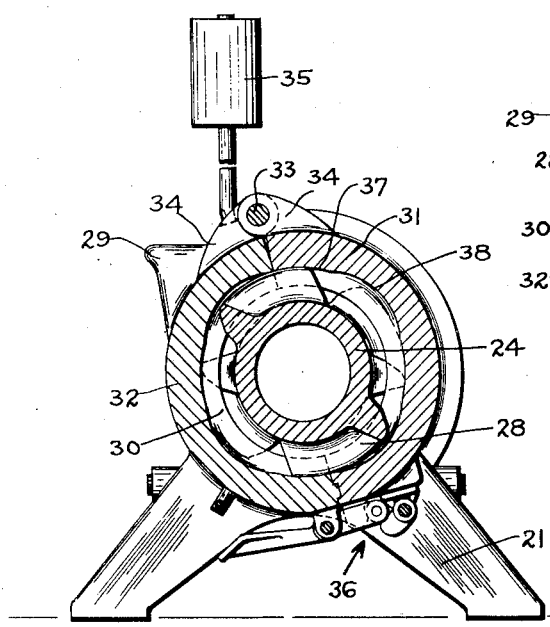
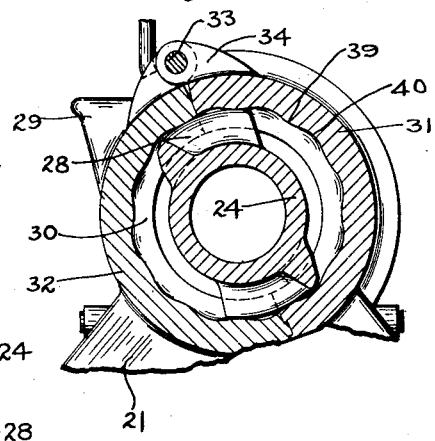

April 5, 1927. 1,623,159
D. R. BOWEN ET AL
MACHINE FOR MIXING OR MASTICATING RUBBER AND LIKE MATERIAL
Filed Oct. 15, 1921    3 Sheets-Sheet 2

Inventor
David R. Bowen
and Carl F. Schnuck
By Henry F. Rockwell
Attorney

April 5, 1927.
D. R. BOWEN ET AL
1,623,159
MACHINE FOR MIXING OR MASTICATING RUBBER AND LIKE MATERIAL
Filed Oct. 15, 1921    3 Sheets-Sheet 3
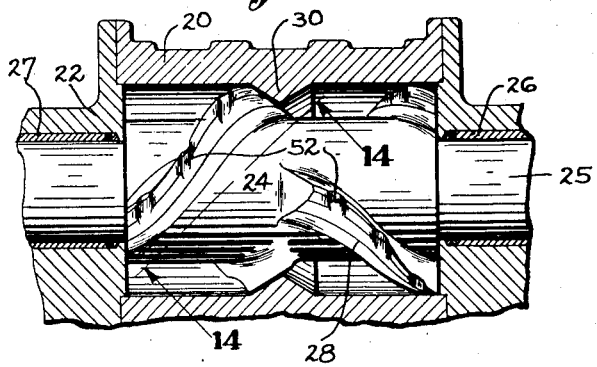
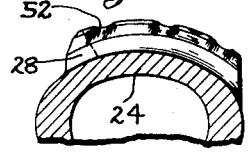
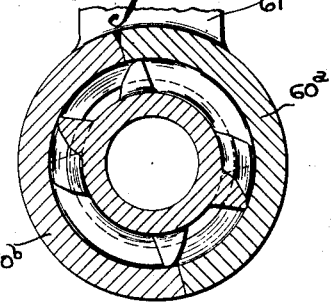
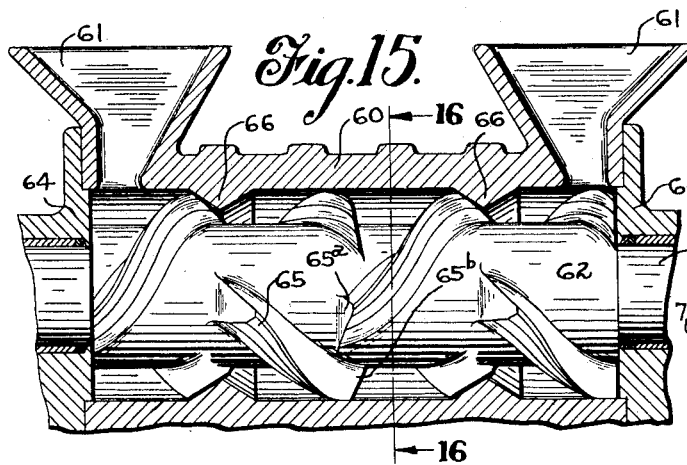
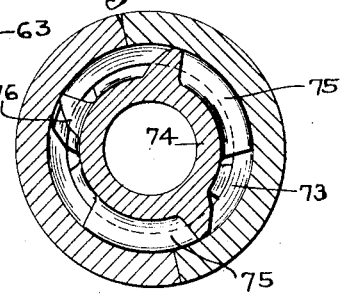
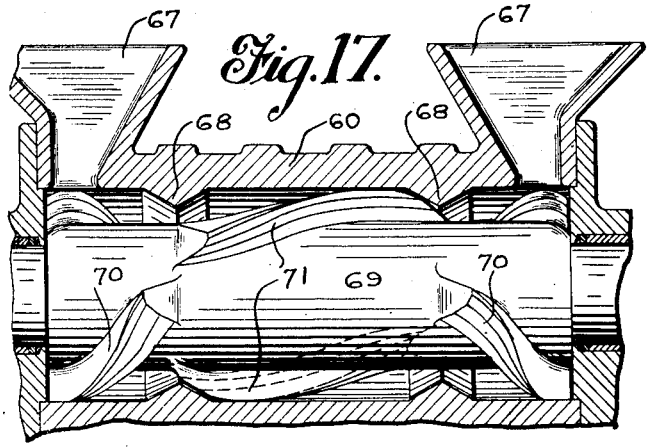
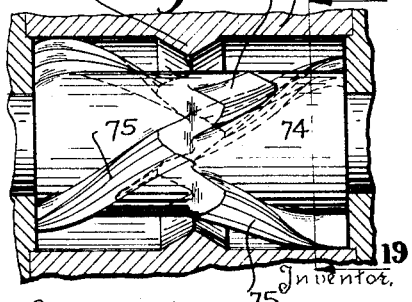

Patented Apr. 5, 1927.

1,623,159

UNITED STATES PATENT OFFICE.

DAVID R. BOWEN, OF ANSONIA, AND CARL F. SCHNUCK, OF NEW HAVEN, CONNECTICUT, ASSIGNORS TO FARREL FOUNDRY & MACHINE COMPANY, OF ANSONIA, CONNECTICUT.

MACHINE FOR MIXING OR MASTICATING RUBBER AND LIKE MATERIAL.

Application filed October 15, 1921. Serial No. 507,961.

This invention relates to machines for treating rubber and similar material and has particular reference to machines for masticating, kneading or mixing rubber, which is to be used for various industrial purposes. The machine shown may be advantageously used for example in reducing to a smooth, uniform, plastic mass a mixture of rubber chunks of various sizes, pieces of tar or powdered filling or coloring material, although it will be obvious that the invention is not limited to this particular use, but will be applicable to machines for mixing or masticating various kinds of plastic material.

Machines of this character are generally provided with a mixing chamber cylindrical in shape and a rotary power-driven element mounted in the chamber for mixing or masticating the charge by squeezing, pressing and smearing it against the chamber walls and stirring the mass by propelling it from one end of the chamber to the other. In some machines of this character difficulty has been encountered as the result of the slippage of the mass on the interior surface of the mixing chamber wall. In many cases the mass slides freely on the chamber wall and moves around with the rotor without the latter doing much effective work thereon in the way of forcing the powder into the rubber or squeezing or smearing the latter against the chamber wall. The time required to thoroughly reduce the charge to a smooth, plastic mass is, therefore, considerably lengthened by this slippage, as it is essential for quick mixing that the material be firmly held against the stationary member, so that the blades of the rotor will mash all portions thereof and produce a thorough redistribution of the particles continuously throughout the operation.

One of the primary objects of our invention is to overcome the difficulty above referred to and to provide a mixer of such construction that the charge will be effectively squeezed and smeared against the chamber wall and wherein the slippage of the mass will be greatly reduced.

Another object of our invention is to provide a machine of this character wherein the mass of rubber which is being operated upon will be repeatedly crunched or ground against the chamber walls by the rotor.

Another object of our invention is to construct a rubber masticating machine of improved character and increased efficiency by providing for a varied amount of clearance at a number of points between the blades of the rotor and the chamber walls.

A still further object of our invention is to provide for an intensive wedging of the charge between the blade and the chamber walls at a plurality of points along the length of the chamber and rotor.

To these and other ends the invention consists in the novel features and combinations of parts to be hereinafter described and claimed.

In the accompanying drawings:

Fig. 1 is a vertical central section of a rubber masticating machine embodying the principles of our invention;

Fig. 2 is a sectional view of the same along line 2—2 of Fig. 1;

Fig. 3 is a view similar to Fig. 2 of a somewhat modified form of mixing chamber;

Figs. 12 and 13 are sectional views showing further modifications of the mixing chambers of masticators embodying our invention;

Fig. 14 is a detail sectional view on line 14—14 of Fig. 13;

Fig. 15 is a sectional view through the mixing chamber of a masticator having an elongated chamber with provision for charging at both ends and a rotor of novel construction;

Fig. 16 is a sectional view on line 16—16 of Fig. 15;

Fig. 17 is a view similar to Fig. 15, but showing a modified form of a device of this character;

Fig. 18 is a sectional view of a rubber mixer of modified construction; and

Fig. 19 is a sectional view on line 19—19 of Fig. 18.

Figure 4:
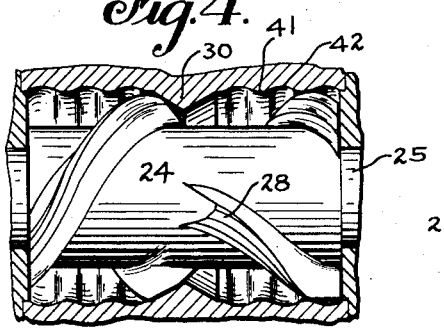
Fig. 4 is a detail sectional view of a mixing chamber showing a further modification of our invention.

In order to illustrate the principles of our invention, we have shown a rubber working machine having a horizontal mixing chamber 20 of generally cylindrical shape mounted between suitable standards or end frames 21 having heads 22 which close the cylinder at the respective ends. The end frames and the body portion of the cylinder may be conveniently interconnected by bolts 23. A rotary mixing element 24 is provided within the mixing chamber having a horizontal shaft 25 with bearings 26 and 27 in the respective cylinder heads. That portion of the rotor within the chamber is provided with a plurality of blades 28 for mixing or kneading the material which, in this instance, is charged into the cylinder through the end charging opening or hopper 29.

In the particular machine shown, the blades are so arranged that the material in one end of the chamber is picked up by the blades and while being forcibly pressed and worked against the inner periphery of the chamber is moved toward and past the center of the chamber into the other end portion thereof, while simultaneously the material in the last named end is similarly worked against the periphery of the chamber and moved in a reverse direction. In the passage from one end of the chamber to the other the material is squeezed or forced past an annular rib 30 extending around the periphery of the chamber wall at an intermediate portion thereof.

The blades adjacent the rib are so shaped that a relatively small opening remains at this portion of the chamber and the material is squeezed or extruded past this rib by the blades in a manner which effectively works the mass into plastic condition and incorporates the powdered filling material thereinto.

The working chamber of the machine shown is divided longitudinally into sections, one section being hinged to the other at the upper portion of the casing. One of the sections 31 is fixed relatively to the heads, but the other section 32 may be swung on its hinge or pivot in such a manner as to provide for the discharge of the material for the casing at the bottom of the latter. This hinge is provided by a longitudinal pintle 33 which is inserted through perforated lugs 34 upon the casing sections. A suitable counterweight 35 is provided to normally maintain the chamber in open position. When the chamber is closed, it may be locked by suitable latching and locking means designated generally by the numeral 36 and which it is unnecessary to describe with greater particularity in this application, as no claim is made thereto herein.

It sometimes occurs that in machines of this type where the rotor which is intended to mash or smear the material against the chamber wall has a substantially uniform action and where there is substantially uniform clearance between the rotor blades and the chamber wall at all points in the chamber periphery, the slippage of the material around the chamber with the rotor is so great as to prevent proper mixing. We have discovered, however, that where the interior surface or face of the chamber is properly formed, this slipping action can be prevented and also there can be obtained a crunching or squeezing action of the mass of material between the rotor and the chamber wall at a number of points along the length and upon the periphery of the chamber, thus greatly increasing the efficiency of the machine and correspondingly shortening the time required for the mixing operation.

To this end in the embodiment of our invention shown in Figs. 1 and 2, we have provided a plurality of longitudinally extending, projecting and protruding ribs 37 formed upon the interior wall of the chamber and arranged to project inwardly, so that the clearance space between the rotor blades and the chamber wall is substantially reduced at the points where these ribs are formed. As shown in the first two figures of the drawings, the ribs 37 are substantially parallel with the axis of the chamber and are relatively large, being in the form of rounded ridges in cross-section and extending substantially from one end of the chamber to the other. Between the ridges 37 will be formed in effect corresponding depressions or valleys 38. It will be apparent that the mass of material, when it is being carried around by the blades in its passage from one end of the chamber to the other, will, when it is brought into contact with one of the protruding ribs or ridges, be squeezed or pressed and crunched against the ridge by the blades with the result that the rubber mass will be effectively spread out and the powdered coloring matter effectively ground into it, the particles being so thoroughly redistributed that a homogeneous plastic mass is obtained in a relatively short time. If it were not for the presence of the ridges or ribs, there would be a tendency for the mass simply to slip continuously about the inner surface of the mixing chamber. The rib, however, opposes and prevents any such tendency and causes the material to be effectively pressed and squeezed in the relatively confined space between the rotor blade and the cooperating rib. There is provided at these points a raised surface against which the rotor works and which in connection with the rotor produces an intensive wedging action of the material. These ribs or raised surfaces offer a certain amount of resistance to the material in the chamber and serve to catch the material and hold it back to some extent, so as to prevent any slipping action. This tendency to hold back the material is not, however, great enough to hold the entire mass. Moreover, the relatively large and rounded protrusions shown are not apt to become worn down as would smaller or minute projections upon the active surface of the chamber.

The material in the chamber will be effectively caught between the tip of the blade and the chamber wall, due to the fact that the clearance between the blade and wall will be constantly varying as the blade advances. This produces a grinding action of the particles of the mass upon the fixed surface and redistributes the particles in a much more thorough and efficient manner than when the clearance space between the blade and chamber walls is constant and the charge has a tendency to assume a certain shape and position in a solid mass in front of the blade and be pushed around by it without the proper kneading and smearing action.

In Fig. 3 we have shown in section a mixing chamber similar to that shown in Fig. 2, but one in which the number of the projecting or protruding ribs or corrugations 39 is greatly increased with a corresponding increase, of course, in the number of valleys 40. The action of the rotor on the material in this case is substantially like that described in connection with Figs. 1 and 2, except the obvious differences which would be expected with an increased number of protruding ribs or ridges. In the form of mixing chamber shown in Fig. 4, the protruding ridges are disposed annularly about the periphery of the chamber instead of being parallel with the axis, as shown in Figs. 1 to 3. It will be apparent that as the blade is inclined to the axis of the rotor, as the material is carried from the chamber ends toward the center as well as around the chamber, that it will be smeared and crunched against these protruding ribs as well as in the chambers having the longitudinal ribs. In this instance the ridges 41 and the corresponding valleys 42 are situated in a plane substantially at right angles to the rotor axis and parallel to the chamber ends.

Figure 5:
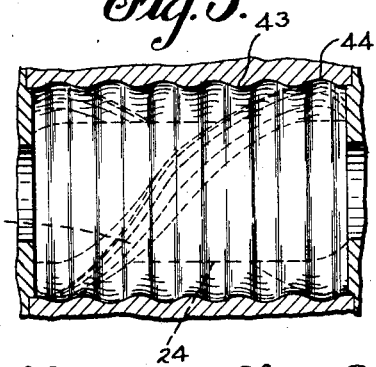
Figs. 5, 6 and 7 are features similar to Fig. 4, but showing other modified forms of our improved rubber masticator.

In Fig. 5 we have shown a mixing chamber which is not provided with the annular intermediate extrusion rib 30 and which has a rotor provided with blades 43, which extend throughout the length of the chamber and carry the material from one end to the other end thereof. The ribs 43 and valleys 44 in this instance extend annularly about the cylinder and are seated in planes at right angles to the rotor axis, as in the form of our invention shown in Fig. 4.

Figure 6:
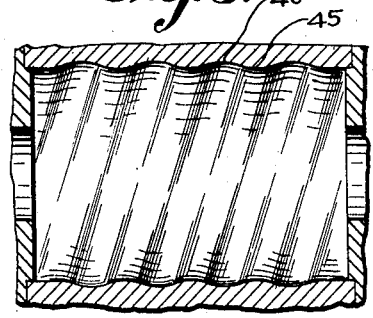

In Fig. 6 we have shown a still further modification in which the ribs 45 and valleys 46 formed upon the inner surface of the chamber are inclined relatively to the chamber axis, all of them, however, being parallel to each other or extending in the same direction.

Figure 7:
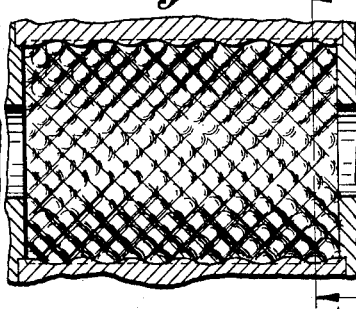
Figure 8:
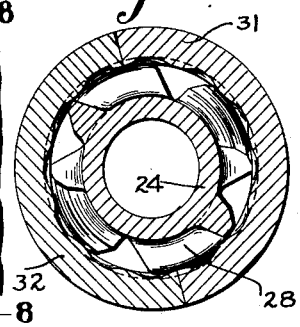
Fig. 8 is a sectional view on line 8—8 of Fig. 7.

In Fig. 7, we have shown a further modification in which the chamber wall is provided with a plurality of protrusions or protuberances, which may be considered as being formed of two sets of ridges and valleys, each set being inclined relatively to the chamber axis and those of one set intersecting and crossing those of the other to form the protuberances, as shown.

Figure 9:
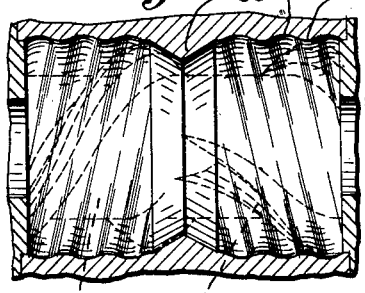
Figs. 9 and 10 are sectional views showing further modifications of our device.

In Fig. 9, we have shown a mixing chamber provided with the intermediate extrusion rib 30, each end of the chamber being provided with a plurality of annular ribs 47 and valleys 48, which are oppositely inclined to the chamber axis, that is, the ridges at each end are inclined toward the upper portion of the annular rib at the intermediate portion of the chamber.

Figure 10:
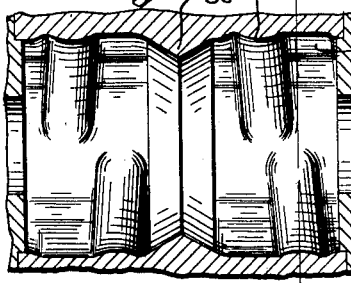
Figure 11:
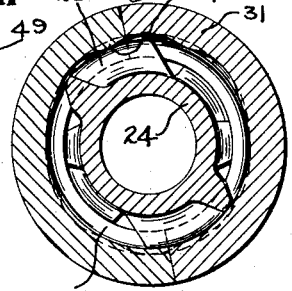
Fig. 11 is a transverse sectional view on line 11—11 of Fig. 10.

In Fig. 10 is shown a further modification wherein the mixing chamber is provided with a plurality of ribs 49 extending longitudinally thereof parallel to the axis and a number of projecting ridges 50 extending generally around the chamber wall, but not forming complete circular ribs. Each, as shown, is approximately semi-circular in form and is inclined to some extent relatively to the chamber axis. It will be seen that the tendency of the material to slip upon the chamber wall is, in this case, opposed both in a longitudinal and circumferential direction.

Figure 12:
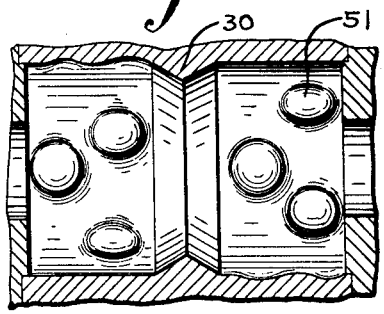

In Fig. 12 a further modification is shown in which a plurality of individual bosses or protrusions 51 are provided upon the chamber wall. The purpose and effect of these projections are to cause variations in the clearance space between the rotor blades and the chamber wall just as in the modifications of our invention, heretofore described.

In Figs. 13 and 14, we have shown a modified form of rotor blade, which is constructed to prevent the slippage of material about the surface of the chamber by being provided with edge grooves 52, which permit parts of the material to become wedged therein and serve also to vary the clearance space between the rotor blade and the chamber wall in somewhat similar manner to the projections or protruding ribs in the devices heretofore described. It will be seen that when these grooves are provided, the edge of the blade will have a tendency to grind or crunch the material more effectively against the chamber wall and that the clearance of the blade at all portions of the length thereof will not be constant.

In Figs. 15 and 16, we have shown a modified form of a rubber working machine which is provided with a somewhat elongated mixing chamber 60 provided at each end with a charging hopper 61. The mixing chamber is provided with a rotor 62 extending longitudinally through the same and having end bearings 63 in the heads 64 of the chamber. In this instance the rotor is provided with a plurality of blades 65 arranged in two sets. Each set tends to work the material toward and past one of the two annular extrusion ribs 66. The blades at the ends of the chamber below the charging openings tend to carry the material towards the intermediate portion of the chamber past the corresponding rib, while in that portion of the chamber between the two extrusion rubs, the blades of one set tend to pick up the material and carry it to the left, as shown in Fig. 15, the blades of the other set pick up the material and carry it toward the right. It will be seen that the material, therefore, which is charged through one of the end openings will tend to be retained in that portion of the chamber and will not be carried as a whole past the intermediate portion of the chamber and delivered to the other set of blades to be carried to the opposite end. There will, however, be some interchange of material between the two blades and to prevent any tendency of the mass to be clogged in the central portion of the chamber, the adjacent portions of the blades and the two sets overlap to some extent, as shown by the ends 65ᵃ and 65ᵇ in Fig. 15. The chamber is provided with a fixed section 60ᵃ and a swinging discharge section 60ᵇ similar to the sections 31 and 32 of the mixing chamber shown in Figs. 1 and 2.

There are provided in this way two effective rubber mixers housed in the one chamber and worked by the one rotor. In addition there is an interchange of material to some extent between the two mixers, so that in addition to the combining of two machines into one, this additional feature of interchanging of material is obtained.

In Fig. 17, we have shown a rubber worker similar to that shown in Fig. 15, in that it is provided with an elongated mixing chamber 60 having fixed and swinging sections and a hopper 67 at each end and provided with two annular extrusion ribs 68 and a bladed rotor 69. It will be seen that the blades 70 in each end of the chamber are all of substantially the same form as the corresponding blades on the rotor shown in Fig. 15, and that they tend to pick up the material in the chamber ends and carry it past the extrusion rib toward the intermediate portion of the chamber. The blades 71 upon the intermediate portion of the rotor in this case extend substantially the entire distance between the two extrusion ribs, so that one of these blades picks up any material which has been forced past the left hand rib 68 and moves it longitudinally of the chamber past the other rib 68 and into the right hand chamber end, while the other blade 71 picks up any material which has been moved past the right hand extrusion rib 68 and carries it into the left hand end of the chamber. There is, therefore, in this instance a constant and continual interchange of material between the chamber ends, so that the material which is charged in at one end of the chamber will be thoroughly and homogeneously mixed with that charged in the opposite end.

In Figs. 18 and 19, we have shown a modified form of rubber working machine, which is provided with the usual mixing chamber 72 having the intermediate annular extrusion rib 73 and the rotor 74 provided with the usual blades 75. In some instances it has been noted that there is a tendency for a portion of the mass of material which is being masticated in the chamber to collect or become clogged in the intermediate portion and remain there instead of being carried past the rib and into the other end of the chamber by the blades. To overcome this difficulty, we have provided a pair of oppositely disposed blades 76 in addition to the usual blades 75, which are so shaped and disposed as to throw the material away from the center of the chamber. These blades are relatively short, so that they will release the material when it has been moved a short distance from the intermediate portion of the mixing chamber. It has been found that such an arrangement will overcome any tendency of the material to collect in the middle of the chamber and will carry such material toward the ends where it will be again picked up by the blades and properly operated upon.

It will be understood, of course, that the annular extrusion rib may or may not be used with any of the forms of the projecting or protruding ridges upon the chamber walls and that many other changes may be made and various modifications resorted to within the spirit of the invention, as defined by the appended claims.

We do not claim in this application a rubber mixing machine comprising a working chamber having hoppers at both ends thereof, and means for working the material from the ends of the chamber toward the center, or other features of construction claimed in our Patent No. 1,496,620, granted June 3, 1924.

What we claim is:

1. A rubber mixer comprising a mixing chamber and a rotor mounted therein, the working surface of said chamber being provided substantially throughout its length with protrusions extending toward the rotor, said rotor being provided with means to work the charge from each end of the chamber toward and into the opposite end.

2. A rubber mixer comprising a suitably supported mixing chamber and a rotor mounted therein, one of said members being provided with protruding portions upon and substantially throughout its active surface whereby a diminishing of the clearance space between the two is produced and an intensive wedging action on the material is effected at a plurality of points throughout the length of the chamber, the rotor being provided with blades for moving the material between said protruding portions from each end of the chamber toward the intermediate portion thereof, and the blades upon one end of the rotor being staggered with respect to the blades upon the other end thereof.

3. A rubber working machine provided with a mixing chamber and a rotor having working blades in both ends of the chamber, said chamber having rounded protrusions upon its active surface to cooperate with the blades in both ends of the chamber and prevent slippage of the material, the blades upon the rotor working the material from the ends toward and past the central portion thereof around and between said protrusions, the latter projecting into the chamber a sufficient distance to prevent slippage of the material and to effect a wedging action thereupon in cooperation with the rotor blades but not projecting into the chamber sufficiently far to prevent the material being worked by the rotor from the ends toward an intermediate part of the chamber between the protrusions.

4. A rubber working machine having a mixing chamber provided with ribs upon its inner surface to catch and hold the material to some extent in its passage around the chamber and increase the pressure upon the treated material, said ribs being spaced substantially about the entire periphery of the chamber, and means in each end of the chamber to move the material past the central portion thereof and into the other end.

5. A rubber working machine having a mixing chamber provided with protruding ribs substantially throughout the length thereof, said ribs protruding into the chamber to increase the pressure on the treated material, and means in each end of the chamber to move the material past the central portion thereof and into the other end.

6. A rubber working machine having a mixing chamber and a bladed rotor therein arranged to clear the walls, and projections on the inner surface of the chamber wall extending into the clearance space between the chamber and the rotor blades to vary the amount of said clearance at a plurality of points in the length of the chamber, the rotor blades adjacent one end of the chamber being arranged to move substantially the entire charge in that end of the chamber toward the opposite end thereof between and around said protrusions, the movement of the material by the rotor adjacent the chamber wall and between the protrusions being the same as the direction of movement adjacent the rotor between the blades thereof.

7. A rubber mixing machine comprising a mixing chamber provided with longitudinally extending protruding ribs upon substantially its entire inner surface, and a bladed rotor for working the material adjacent the inner surface of the chamber wall between said ribs from the end of the chamber toward the intermediate part thereof as well as for working the material in the same direction adjacent the rotor between the blades thereof.

8. A rubber mixing machine comprising a mixing chamber having a bladed rotor therein, the rotor blades being arranged to work the material from each end of the chamber toward and past the intermediate portion thereof, the inner surface of the chamber wall having rounded protrusions thereon to prevent slippage of the material and to produce an intensive wedging action, the entire batch of material in each end of the chamber being worked in one direction only by the blades upon that end of the rotor.

9. A rubber mixing machine comprising a mixing chamber having a bladed rotor therein, the rotor blades being arranged to work the material from each end of the chamber toward and past the intermediate portion thereof, the inner surface of the chamber wall having rounded protrusions thereon to prevent slippage of the material and to produce an intensive wedging action, the entire batch of material in each end of the chamber being worked in one direction only by the blades upon that end of the rotor, and the blades upon one end of the rotor being arranged in staggered relation with respect to the blades upon the other end thereof.

10. A rubber mixer having a mixing chamber provided with an intermediate extrusion rib and protrusions disposed upon its working face, substantially throughout the length thereof.

11. A rubber mixer having a mixing chamber provided with an intermediate extrusion rib and protrusions upon its working face in both ends of the chamber.

12. A rubber mixer having a chamber divided into two sections by an intermediate annular rib, each section of which is provided with protrusions on its working face.

13. A rubber working machine having a mixing chamber provided with an intermediate annular extrusion rib and means positioned upon each side of said rib to cause a wedging action of the material within the chamber, to prevent slippage thereof about the chamber wall.

14. A rubber working machine having a mixing chamber and a bladed rotor operating therein, said chamber being provided with an intermediate extrusion rib projecting inwardly toward the rotor and additional means upon each side of said rib to vary the clearance space between the chamber wall and rotor.

15. A rubber working machine having a mixing chamber provided with an intermediate annular extrusion rib and a rotor cooperating therewith, and means spaced circumferentially about the entire periphery of the chamber to vary the clearance between the rotor and the chamber walls to prevent slippage of the material.

16. A rubber working machine having a mixing chamber, the rotor operatively mounted therein and the intermediate extrusion rib upon the chamber wall, said chamber also being provided with means upon both sides of said rib to vary the clearance space between its working face and the rotor.

17. A rubber working machine comprising a mixing chamber provided with a plurality of extrusion ribs, a rotor operatively mounted to mix the material in the chamber, and provided with blades to cooperate with each of said ribs.

18. A rubber working machine having a mixing chamber, a rotor mounted therein, said chamber having a pair of extrusion ribs each of which is spaced from the adjacent chamber end, and blades upon the corresponding end of the rotor to force the material past each of said ribs.

19. A rubber working machine having a mixing chamber, an extrusion rib upon said chamber wall adjacent each end thereof, a rotor operatively mounted within the chamber and having blades upon each end thereof to force the material inwardly past the corresponding rib.

20. A rubber working machine having a mixing chamber provided with a pair of annular extrusion ribs and a rotor operatively mounted within the chamber having a set of blades cooperating with each of said ribs.

21. A rubber working machine having a mixing chamber provided with a pair of annular extrusion ribs and a rotor operatively mounted within the chamber having a set of blades to force the material past each of said ribs in opposite directions.

22. A rubber mixing machine having a mixing chamber and a pair of annular extrusion ribs upon the wall thereof, a rotor operatively mounted within the chamber and having blades upon that portion thereof between the extrusion ribs to force the material outwardly past each of said ribs.

23. A rubber working machine having a chamber provided with a feed opening at both ends thereof, means within said chamber to mix the material fed in at the respective ends, said means being substantially independent in their operations.

24. A rubber working machine having a single chamber provided with a plurality of mixing devices substantially independent of each other.

25. A rubber working machine consisting of a single chamber and a single rotor operating therein, and having a plurality of substantially independently operating rubber mixing devices.

26. A rubber working machine consisting of a single chamber and a single rotor operating therein and having a plurality of substantially independently operating rubber mixing devices, and a separate feed opening for each of said devices.

27. A rubber working machine having a single chamber and a single rotor operating therein, and having a plurality of substantially independently operating mixing devices disposed end to end within said chamber and along the rotor.

28. A rubber mixing machine comprising a mixing chamber provided with a plurality of constricted portions and a bladed rotor operable within said chamber and cooperating with said constricted portions to cause a mixing extrusion of said materials.

29. A rubber mixing machine comprising a mixing chamber, a rotor operable therein, said chamber and rotor being provided with cooperating means to cause a mixing extrusion of said materials at a plurality of points in the length of the chamber.

30. A rubber mixing machine comprising a chamber, said chamber being provided with a plurality of transverse extrusion ribs spaced along the length thereof, a rotor, and blades upon the rotor cooperating with said ribs to cause an extrusion of the material in the chamber past the ribs.

31. A rubber mixing machine comprising a working cylinder provided with a plurality of constricted portions spaced along the length thereof, a rotor in said cylinder extending through said constricted portions and provided with blades constructed and arranged to force the material in the cylinder back and forth through said constricted portions thereof.

32. A rubber mixing machine having a chamber and a rotor mounted therein, said rotor having means to work the charge from each end of the chamber toward and into the opposite end, and the chamber consisting of a single cylinder having its working surface provided with protrusions extending toward the rotor to prevent slippage of the material.

33. A rubber working machine comprising a mixing chamber and a rotor therein, said rotor being provided with blades upon each end thereof to work the material back and forth in the chamber, the blades upon one end of the rotor being staggered relative to those upon the other end, the chamber comprising a single cylinder provided with ribs upon its inner surface to prevent slippage of the material therearound.

34. A rubber working machine having a mixing chamber, and means in each end of the chamber to move the material past the central portion thereof and into the other end, the chamber consisting of a single cylinder having protrusions thereon substantially throughout the length of the working surface thereof to increase the pressure on the treated material.

35. A rubber working machine comprising a chamber, a rotor mounted within the chamber, blades upon one end of the rotor to work the material past the central portion thereof and into the opposite end, blades upon the other end of the rotor to work the material past the central portion of the chamber and into the first said end, said chamber consisting of a single cylinder having protruding portions upon its inner surface to increase the pressure upon the treated material.

36. A rubber mixing machine having a chamber and a rotor mounted therein, the inner surface of the chamber having relatively wide, shallow, longitudinally extending, transversely curved valleys formed therein, and the wall of the chamber between said valleys constituting raised ribs projecting toward the rotor to prevent slippage of the treated material and increase the pressure thereon, and said rotor having means to work the charge from each end of the chamber toward and into the opposite end.

In witness whereof, we have hereunto set our hands on the 10th day of October, 1921.

DAVID R. BOWEN.
CARL F. SCHNUCK.